US012290826B2

(12) United States Patent
Chen et al.

(10) Patent No.: US 12,290,826 B2
(45) Date of Patent: May 6, 2025

(54) AUTOMATED SPRAY SYSTEM TO PRODUCE AN ELASTOMERIC PAD ON A RAILROAD TIE

(71) Applicant: Dow Global Technologies LLC, Midland, MI (US)

(72) Inventors: Yinglong Chen, Lake Jackson, TX (US); Larry D. Dotson, Midland, MI (US); Huang Wu, Lake Jackson, TX (US); Jason A Reese, Midland, MI (US); Kevin W. Light, Marietta, GA (US); Annette Baker, Marietta, GA (US); J. Cody Clinton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 378 days.

(21) Appl. No.: 17/791,555

(22) PCT Filed: Jan. 7, 2021

(86) PCT No.: PCT/US2021/012476
§ 371 (c)(1),
(2) Date: Jul. 8, 2022

(87) PCT Pub. No.: WO2021/142103
PCT Pub. Date: Jul. 15, 2021

(65) Prior Publication Data

US 2023/0034329 A1 Feb. 2, 2023

Related U.S. Application Data

(60) Provisional application No. 62/958,870, filed on Jan. 9, 2020.

(51) Int. Cl.
*B05B 12/14* (2006.01)
*B05B 7/00* (2006.01)
(Continued)

(52) U.S. Cl.
CPC ........ *B05B 12/1418* (2013.01); *B05B 7/0018* (2013.01); *B05B 7/0093* (2013.01);
(Continued)

(58) Field of Classification Search
CPC . B05B 12/1418; B05B 7/0018; B05B 7/0093; B05B 12/126; B05B 13/005;
(Continued)

(56) References Cited

U.S. PATENT DOCUMENTS 4,302,552 A 11/1981 Hongu et al.
4,652,495 A 3/1987 Sato et al.
(Continued)

FOREIGN PATENT DOCUMENTS

CN 101046077 B 2/2014
CN 107460792 A 12/2017
(Continued)

OTHER PUBLICATIONS

International Preliminary Report on Patentability for related PCT Application PCT/US2021/012476, Mailed Jul. 21, 2022 (7 pgs).
(Continued)

*Primary Examiner* — Qingzhang Zhou
*Assistant Examiner* — Joel Zhou

(57) ABSTRACT

The present disclosure provides for an automated spray system (100) to produce an elastomeric pad on a railroad tie. The automated spray system (100) includes a two-component spray system (102) for spraying a two-component reaction mixture to produce the elastomeric pad on the railroad tie. The automated spray system further includes a gantry system (140) having girder (146) that supports the spray applicator.

9 Claims, 8 Drawing Sheets

(51) Int. Cl.

| | |
|---|---|
| ***B05B 12/12*** | (2006.01) |
| ***B05B 13/00*** | (2006.01) |
| ***B05B 13/02*** | (2006.01) |
| ***B05B 13/04*** | (2006.01) |
| ***E01B 3/46*** | (2006.01) |

(52) U.S. Cl.
CPC .......... *B05B 12/126* (2013.01); *B05B 13/005* (2013.01); *B05B 13/0278* (2013.01); *B05B 13/041* (2013.01); *E01B 3/46* (2013.01); *E01B 2204/01* (2013.01)

(58) Field of Classification Search
CPC ..... B05B 13/0278; B05B 13/041; E01B 3/46; E01B 2204/01
See application file for complete search history.

(56) References Cited

U.S. PATENT DOCUMENTS

| | | | | |
|---|---|---|---|---|
| 7,044,340 | B1 | 5/2006 | McClellan | |
| 8,075,302 | B1 * | 12/2011 | McClellan | B29B 7/7447 366/159.1 |
| 9,056,714 | B2 | 6/2015 | Whitener | |
| 2012/0091215 | A1 | 4/2012 | Malone | |
| 2013/0122186 | A1 | 5/2013 | Hoppel | |

FOREIGN PATENT DOCUMENTS

| | | | |
|---|---|---|---|
| CN | 108031577 | A | 5/2018 |
| EP | 0440597 | B1 | 2/1994 |
| EP | 2625338 | B1 | 9/2016 |
| JP | 2002081003 | A | 3/2002 |
| JP | 2007051457 | A | 3/2007 |
| KR | 20190130188 | A | 11/2019 |
| WO | 2008101269 | A1 | 8/2008 |

OTHER PUBLICATIONS

International Search Report & Written Opinion for related PCT Application PCT/US2021/012476, Mailed May 12, 2021 (12 pgs).

* cited by examiner

AUTOMATED SPRAY SYSTEM TO PRODUCE AN ELASTOMERIC PAD ON A RAILROAD TIE

This application is a National Stage Application under 35 U.S.C. § 371 of International Application Number PCT/US2021/012476, filed Jan. 7, 2021 and published as WO 2021/142103 on Jul. 15, 2021, which claims the benefit to U.S. Provisional Application 62/958,870, filed Jan. 9, 2020, the entire contents of which are incorporated herein by reference in its entirety

TECHNICAL FIELD

The present disclosure relates generally to a spray system and more particularly to an automated spray system for producing an elastomeric pad on a railroad tie.

BACKGROUND

Railway tracks consist of rails, fasteners, railroad ties and ballast in addition to the underlying subgrade. Railroad ties are elongate rectangular beams that sit on the ballast and onto which the rails are attached with the fasteners. The railroad ties server two primary purposes, first is to transfer the weight of the train from the rails to the ballast and the subgrade underneath, and second to hold the rails in their correct relative position to each other to ensure the proper rail gauge for the train.

Stabilizing the railroad ties with respect to the ballast and underlying subgrade is an important consideration for the long term maintenance and preservation of the railway track. Movement of the railroad ties (e.g., lateral movement of the railroad ties) can lead to issues that can delay track use and safety. The railroad ties are generally laid on a bed of stone known as ballast. Over time, the railroad ties can be moved by the weight of the passing trains. If there is excessive movement between the ballast and the railroad tie the rails can be moved out of position to the extent that the rails may become uneven causing swaying and rough riding leading to train speed restrictions for the affected area and subsequent maintenance to restore the desired track geometry.

As such, there is a need in the art to help minimize the movement of railroad ties relative to ballast.

SUMMARY

Embodiments of the present disclosure provide for an automated spray system to produce an elastomeric pad on a first major surface of a railroad tie. The elastomeric pad produced by the automated spray system has the advantage of being both uniform, thereby providing for a more predictable pad geometry, and producing a surface profile that may help to stabilize the railroad tie while in use, therefore helping minimize the movement of railroad ties relative to ballast. For example, the railroad tie of the present disclosure includes an elastomeric pad of a two-component foam defining a surface with a series of projections that, as discussed herein, can help entrap ballast under the railroad tie to enhance railroad tie lateral movement resistance. The automated spray system of the present disclosure produces such an elastomeric pad.

According to the present disclosure, the automated spray system produces an elastomeric pad on a first major surface of a railroad tie, where the automated spray system includes a two-component spray system having a spray applicator with a nozzle for spraying a two-component reaction mixture to produce the elastomeric pad on the railroad tie. The two-component spray system includes a first storage tank to hold a first liquid component of the two-component reaction mixture, a second storage tank to hold a second liquid component of the two-component reaction mixture, a first hose, a second hose, a first pump having an inlet and an outlet, a second pump having an inlet and an outlet, and the spray applicator with a mixing chamber to mix the first liquid component and the second liquid component of the two-component reaction mixture, the mixing chamber having a first mixing chamber inlet, a second mixing chamber inlet, a mixing chamber outlet and the nozzle at the mixing chamber outlet. For the embodiments, the first hose fluidly connects the first liquid component in the first storage tank to the inlet of the first pump. The second hose fluidly connects the second liquid component in the second storage tank to the inlet of the second pump. Finally, the outlet of the first pump fluidly connected to the first mixing chamber inlet and the outlet of the second pump fluidly connect to the second mixing chamber inlet of the mixing chamber of the spray applicator.

The automated spray system further includes a gantry system having a first support frame, a second support frame and a girder that extends between and is supported by the first support frame and the second support frame. For the embodiments, the girder supports the spray applicator. The gantry system straddles the railroad tie to position the nozzle of the spray applicator on the girder in a position over the first major surface of the railroad tie. The automated spray system further includes a trolley having a motor to provide relative motion between the nozzle of the spray applicator and the first major surface of the railroad tie. In addition, the automated spray system includes a control unit coupled to the first pump and the second pump including machine-readable instructions executable to regulate the volumetric flow rate of the first liquid component through the first mixing chamber inlet, the volumetric flow rate of the second liquid component through the second mixing chamber inlet and thereby the volumetric flow rate of the two-component reaction mixture spraying from the nozzle of the spray applicator, and where the control unit is coupled to the motor of the trolley to control the motor of the trolley to provide the relative motion between the nozzle of the spray applicator and the first major surface of the railroad tie as the spray applicator sprays the two-component reaction mixture onto the first major surface of the railroad tie to produce the elastomeric pad.

In one embodiment, the spray applicator is attached to the trolley and the trolley is mounted on the girder, where the trolley travels along a longitudinal axis of the girder under the control of the control unit to provide the relative motion between the nozzle of the spray applicator and the first major surface of the railroad tie along a first-axis of travel. In an alternative embodiment, at least a portion of the gantry system is mounted on the trolley to allow the motor of the trolley system to move the nozzle of the spray applicator relative the first major surface of the railroad tie. For the various embodiments, the gantry system further includes a lateral support frame along which the girder travels under the control of the control unit perpendicular to the longitudinal axis of the girder to provide the girder with a second-axis of travel.

For the various embodiments, the automated spray system further includes a railroad tie support frame having a first elongate guide rail, a second elongate guide rail parallel with and spaced laterally from the first elongate guide rail and vertical guide pins longitudinally space along each of the first elongate guide rail and the second elongate guide rail, where the first elongate guide rail and the second elongate guide rail support the railroad tie and the vertical guide pins align the first major surface of the railroad tie relative to the girder of the gantry system. In one embodiment, the vertical guide pins align the first major surface of the railroad tie to be parallel with the girder of the gantry system. In an alternative embodiment, the vertical guide pins align the first major surface of the railroad tie to be perpendicular with the girder of the gantry system.

For the various embodiments, the railroad tie support frame of the automated spray system is mounted on the trolley to allow the motor of the trolley system to move the first major surface of the railroad tie supported by the railroad tie support frame relative the nozzle of the spray applicator. For the various embodiments, the first support frame and the second support frame of the gantry system can further include wheels to support the gantry system, where the wheels allow for the gantry system to move relative the railroad tie.

For the various embodiments, the girder includes a first end and a second end spaced longitudinally from the first end; the first support frame includes a first vertical guide rail and the second support frame includes a second vertical guide rail opposite the first vertical guide rail; and a first guide assembly at the first end of the girder and a second guide assembly at the second end of the girder, where the first guide assembly engages the first vertical guide rail and the second guide assembly engages the second vertical guide rail to allow the girder to move vertically (perpendicularly) relative the plane of the first major surface of the railroad tie.

The present disclosure also provides for a railroad tie, where the railroad tie includes an elongate rail tie having the first major surface that extends longitudinally from a first end to a second end defining a longitudinal length of the elongate rail tie therebetween and an elastomeric pad of the two-component foam on the first major surface of the elongate rail tie. For the various embodiments, the elastomeric pad of the two-component foam has an exterior layer distal to the first major surface and defines a surface with a series of projections, each projection having an amplitude of 0.01 centimeter to 2 centimeter. The projections of the exterior layer help to entrap ballast under the railroad tie to enhance railroad tie lateral movement resistance.

For the various embodiments, the series of projections define a waveform with waves of the amplitude of 0.01 centimeter to 2 centimeter and a wavelength of 0.01 centimeter and 20 centimeter. For the various embodiments, the waveform of the first major surface can a repeating wave pattern. For example, the repeating wave pattern can be selected from the group consisting of a sinusoidal wave pattern and a trochoid wave pattern. Such repeating wave patterns can be either straight lines and/or curved lines. For the various embodiments, the repeating wave pattern has a wave peak to a wavelength ratio value of 0.1 to 1.0. For the various embodiments, the amplitude of each projection can have the same value. In an alternative embodiment, the amplitude of each projection varies along the surface of the exterior layer of the two-component foam.

For the various embodiments, the two-component foam is selected from the group consisting of polyurethane foam, polyurea and combinations thereof. For the various embodiments, the elongate rail tie includes ridges extending from the first major surface and extending longitudinally from the first end to the second end of the elongate rail tie, where the elastomeric pad of the two-component foam is positioned between the ridges. For the various embodiments, the elongate rail tie is formed from a material selected from wood, concrete, iron alloy and combinations thereof.

The present disclosure further includes a method of forming the elastomeric pad of the two-component foam on a railroad tie. The method includes supplying an elongate rail tie having a first major surface that extends longitudinally from a first end to a second end defining a longitudinal length of the elongate rail tie; and spraying components of a two-component foam reaction mixture from a spray system on the first major surface of the elongate rail tie, where the spray system deposits the two-component foam reaction mixture to produce an elastomeric pad having an exterior layer distal to the first major surface defining a surface with a series of projections, each projection having an amplitude of 0.01 centimeter to 2 centimeter and where the projections of the exterior layer entrap ballast under the railroad tie to enhance railroad tie lateral movement resistance.

For the various embodiments, spraying the two-component foam reaction mixture from the spray system provides the surface with a periodic waveform with waves of the amplitude of 0.01 centimeter to 2 centimeter and a wavelength of 0.01 centimeter and 20 centimeter. For the various embodiments, spraying the two-component foam reaction mixture from the spray system includes adjusting a spray speed of the spray system moving at a constant rate over the first major surface of the elongate rail tie to form the waveform of the exterior layer of the elastomeric pad. In an alternative embodiment, spraying the two-component foam reaction mixture from the spray system includes adjusting a spray pressure of the spray system moving at a constant rate over the first major surface of the elongate rail tie to form the waveform of the exterior layer of the elastomeric pad.

For the various embodiments, the method further includes moving the first surface of the elongate rail tie at a predetermined speed relative the spray system as the spray system deposits the two-component foam reaction mixture. For the various embodiments, the predetermined speed is not a constant speed.

For the various embodiments, the method of forming the elastomeric pad of the two-component foam on the railroad tie can further include utilizing two or more spray heads to deposit the polyurethane reaction mixture on the first major surface. Utilizing two or more spray heads further can further include individually controlling each of the two or more spray heads to deposit the polyurethane reaction mixture. For the various embodiments, the polyurethane reaction mixture has a gel time of 4 to 15 seconds. For the various embodiments, the two-component foam is selected from the group consisting of polyurethane foam and polyurea.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
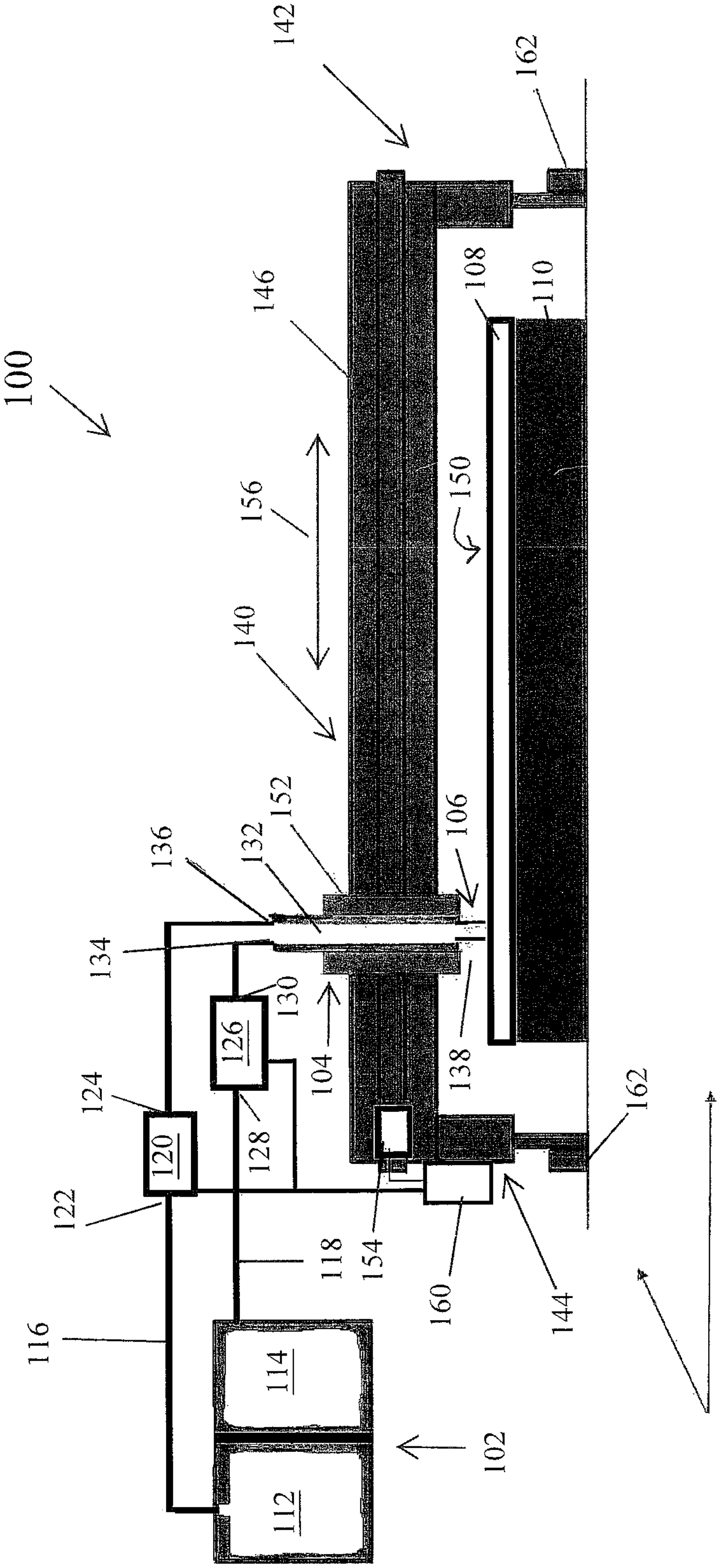
FIG. 1 illustrates an embodiment of the automated spray system according to one embodiment of the present disclosure.

Embodiments of the present disclosure provide for an automated spray system to produce an elastomeric pad on a first major surface of a railroad tie. The elastomeric pad produced by the automated spray system has the advantage of being both uniform, thereby providing for a more predictable pad geometry, and producing a surface profile that may help to stabilize the railroad tie while in use, therefore helping minimize the movement of railroad ties relative to ballast. For example, the railroad tie of the present disclosure includes an elastomeric pad of a two-component foam defining a surface with a series of projections that, as discussed herein, can help entrap ballast under the railroad tie to enhance railroad tie lateral movement resistance. The automated spray system of the present disclosure produces such an elastomeric pad.

Additional advantages offered by the automated spray system of the present disclosure include rapid production of the elastomeric pad on the railroad tie, minimal overspray of the two-component reaction mixture used to form the elastomeric pad on the railroad tie and the formation of a first major surface defining a surface with a series of projections on the railroad tie (wrinkles) that help to enhance the resistance of the railroad tie to lateral movement when in use.

As used herein, "a," "an," "the," "at least one," and "one or more" are used interchangeably. The term "and/or" means one, one or more, or all of the listed items. The recitations of numerical ranges by endpoints include all numbers subsumed within that range (e.g., 1 to 5 includes 1, 1.5, 2, 2.75, 3, 3.80, 4, 5, etc.).

The figures herein follow a numbering convention in which the first digit or digits correspond to the drawing figure number and the remaining digits identify an element in the drawing. Similar elements between different figures may be identified using similar digits. For example, 354 may reference element "54" in FIG. 3, and a similar element may be referenced as 454 in FIG. 4. It is emphasized that the purpose of the figures is to illustrate, and the figures are not intended to be limiting in any way. The figures herein may not be to scale and relationships of elements in the figures may be exaggerated. The figures are employed to illustrate conceptual structures and methods herein described.

FIG. 1 provides an illustration of an embodiment of the automated spray system 100 of the present disclosure for producing an elastomeric pad on a first major surface of a railroad tie. The automated spray system 100 includes a two-component spray system 102 having a spray applicator 104 with a nozzle 106 for spraying a two-component reaction mixture to produce the elastomeric pad 108 on the railroad tie 110. The two-component spray system 102 includes a first storage tank 112 to hold a first liquid component of the two-component reaction mixture, a second storage tank 114 to hold a second liquid component of the two-component reaction mixture.

The two-component spray system 102 further includes a first hose 116, a second hose 118, a first pump 120 having an inlet 122 and an outlet 124, a second pump 126 having an inlet 128 and an outlet 130. The spray applicator 104 also includes a mixing chamber 132 to mix the first liquid component and the second liquid component of the two-component reaction mixture. The mixing chamber 132 has a first mixing chamber inlet 134, a second mixing chamber inlet 136, a mixing chamber outlet 138 and the nozzle 106 at the mixing chamber outlet 138. For the embodiments, the first hose 116 fluidly connects the first liquid component in the first storage tank 112 to the inlet 122 of the first pump 120. The second hose 118 fluidly connects the second liquid component in the second storage tank 114 to the inlet 128 of the second pump 126. Finally, the outlet 124 of the first pump 120 fluidly connected to the first mixing chamber inlet 134 and the outlet 130 of the second pump 126 fluidly connect to the second mixing chamber inlet 136 of the mixing chamber 132 of the spray applicator 104.

Examples of the two-component spray system 102 include those available from Graco Inc., such as Reactor 2 H-XP2 and H-XP3 hydraulic coating and polyurea equipment. Examples of suitable hoses include reactor heated hose (Graco Inc.) and spray applicators, such as those available under the trade designator Fusion Air Purge and Fusion Mechanical Purge available from Graco Inc.

For the various embodiments, the spray applicator 104 can further include an LED and/or a laser light to indicate the spray coverage area to assist with aligning the spray pattern with the surface of the railroad tie to be sprayed with the two-component reaction mixture. For the various embodiments, the spray applicator 104 can be equipped with different types of nozzles, such those including an oscillation movement driver and/or those having a fan tip in order to produce different surface pattern of the pad as discussed herein.

For the various embodiments, the two-component foam is selected from the group consisting of polyurethane foam and polyurea. The polyurethane foam or the polyurea can be a low density elastomer (rubber like), as are known in the art. Examples of such polyurethane foam includes those having a density from 0.3 to 0.9 gram/cm$^3$ and a cell size in a range of 0.01 millimeter (mm) to 1 mm. Other examples of polyurethane foams are also possible.

The automated spray system 100 further includes a gantry system 140. For the various embodiments, the gantry system 140 includes a first support frame 142, a second support frame 144 and a girder 146 that extends between and is supported by the first support frame 142 and the second support frame 144. Components of the gantry system 140 can be formed from structural steel components having cross sectional shapes as are known in the art. Examples of such shapes include, but are not limited to, beams (e.g., I-beam, H-beam), channel shapes (e.g., "C"-beam), angle shapes (e.g., L-shape), plate shapes and hollow structural section (HSS) shapes (e.g., round tubular, square or rectangular tubular shapes), among other known in the art. The structural steel components of the gantry system 140 can be joined by any number of known techniques, including the use of nuts and bolts passing though openings in the structural steel components and the use of welding techniques such as electric arc welding (shielded metal arc welding), gas tungsten arc welding, gas metal arc welding and/or flux-core arc welding, among others. Suitable steels used in the structural steel components include carbon steels, high strength low allow steels and corrosion resistant high strength low allow steels as are known in the art, including those identified and specified by ASTM International.

As illustrated in FIG. 1, the girder 146 supports the spray applicator 104. FIG. 1 also illustrates that the gantry system 140 straddles the railroad tie 110 to position the nozzle 106 of the spray applicator 104 on the girder 146 in a position over the first major surface 150 of the railroad tie 110. The automated spray system 100 further includes a trolley 152 having a motor 154 to provide relative motion between the nozzle 106 of the spray applicator 104 and the first major surface 150 of the railroad tie 110. The motor 154 of the present disclosure can be an electric motor having a rotor with a shaft that turns relative the stator to provide the mechanic power to provide relative motion between the nozzle 106 of the spray applicator 104 and the first major surface 150 of the railroad tie 110.

In addition, the automated spray system 100 includes a control unit 160 coupled to the first pump 120 and the second pump 126, and to the motor 154 of the trolley 152. The control unit 160 includes machine-readable instructions executable to control the first pump 120 and the second pump 126 so as to regulate the volumetric flow rate of the first liquid component through the first mixing chamber inlet 134 and the volumetric flow rate of the second liquid component through the second mixing chamber inlet 136 and thereby the volumetric flow rate of the two-component reaction mixture spraying from the nozzle 106 of the spray applicator 104. As noted, the control unit 160 is also coupled to the motor 154 of the trolley 152 to control the motor 154 of the trolley 152 to provide the relative motion between the nozzle 106 of the spray applicator 104 and the first major surface 150 of the railroad tie 110 as the spray applicator 104 sprays the two-component reaction mixture onto the first major surface 150 of the railroad tie 110 to produce the elastomeric pad 108.

The control unit 160 can include a processing resource and a memory resource. The control unit 160 can be removably coupled or otherwise coupled to the first pump 120, the second pump 126, and to the motor 154 of the trolley 152, as discussed herein. The control unit 160 can facilitate and/or perform various aspects related to spraying the two-component reaction mixture spraying from the nozzle 106 of the spray applicator 104 and moving the trolley 152 to produce the elastomeric pad 108, as discussed herein. For instance, the control unit 160 can control the first pump 120 and the second pump 126 so as to regulate the volumetric flow rate of the first liquid component through the first mixing chamber inlet 134 and the volumetric flow rate of the second liquid component through the second mixing chamber inlet 136 and thereby the volumetric flow rate of the two-component reaction mixture spraying from the nozzle 106 of the spray applicator 104. The control unit 160 also controls the motor 154 of the trolley 152 to provide the relative motion between the nozzle 106 of the spray applicator 104 and the first major surface 150 of the railroad tie 110 as the spray applicator 104 sprays the two-component reaction mixture onto the first major surface 150 of the railroad tie 110 to produce the elastomeric pad 108, as described herein.

The processing resource refers to a hardware processing unit such as a central processing unit (CPU), integrated circuit, a semiconductor based microprocessor, a graphics processing unit (GPU), application specific instruction set processor, coprocessor, network processor, field programmable gate array (FPGA) or similar hardware circuitry that can suitable for retrieval and execution of non-transitory machine-readable instructions such as those stored on and/or downloadable to the memory resource.

The memory resource (i.e., a non-transitory machine-readable medium) refers to any type memory such as volatile and/or non-volatile memory. The memory resource can be any electronic, magnetic, optical, or other physical storage device that stores executable instructions such as non-transitory machine-readable instructions. Thus, the memory resource can be, for example, Random Access Memory (RAM), an Electrically-Erasable Programmable Read-Only Memory (EEPROM), a storage drive, an optical disc, and the like. The non-transitory machine executable instructions can be installed on the memory resource. However, the non-transitory machine-readable instructions can be a portable, external, or remote storage medium, for example, that allows the control unit 160 to download the instructions from a portable/external/remote storage medium. In any case, the non-transitory machine-readable instructions stored on the memory resource can be executed by a processing resource such as processing resource.

As seen in FIG. 1, the spray applicator 104 is attached to the trolley 152, where the trolley 152 is mounted on the girder 146. An example of such a configuration is that of an I-Beam Trolley, where the girder 146 is in the form of an I-beam and where the trolley 152 includes wheels that ride on the lower flanges (adjacent the web) of the I-beam. In an alternative embodiment, the wheels of the trolley 152 can ride on the upper flange of the I-beam. The trolley 152 further includes side plates that both support the wheels and extend away from the I-beam to a suspension plate onto which the spray applicator 104 is fastened so as to allow the nozzle 106 to be positioned over the first major surface 150 of the railroad tie 110. In an additional embodiment, the trolley 152 can be included in a high speed belt drive actuator that is mounted to the girder 146, where the spray applicator 104 is fastened to the trolley 152 that is then moved by the belt of the high speed belt drive actuator to position and move the nozzle 106 over the first major surface 150 of the railroad tie 110. Other suitable devices to be used for the trolley 152 include linear motor stages and linear actuators, as are known in the art.

In the present embodiment, the trolley 152 travels in both directions along a longitudinal axis 156 of the girder 146 under the control of the control unit 160 to provide the relative motion between the nozzle 106 of the spray applicator 104 and the first major surface 150 of the railroad tie 110 along a first-axis of travel 158. The first-axis of travel can be in both directions along the longitudinal axis 156 of the girder 146 under the control of the control unit 160. For the various embodiments, the motor 154 moves the trolley 152 in several ways. For example, the shaft of the motor 154 can be directly coupled to one or more of the wheels of the trolley 152 to provide motion between the nozzle 106 of the spray applicator 104 and the first major surface 150 of the railroad tie 110 under the control of the control unit 160. Alternatively, the shaft of the motor 154 can drive the belt or cable of the high speed belt drive actuator, linear motor stages or linear actuators, or other such device as are known in the art, to provide motion between the nozzle 106 of the spray applicator 104 and the first major surface 150 of the railroad tie 110 under the control of the control unit 160.

FIG. 1 further provides an embodiment in which the first support frame 142 and the second support frame 144 of the gantry system 140 further include wheels 162 to support the gantry system 140. The wheels 162 allow for the gantry system 140 to move relative the railroad tie 110. The wheels 162 can be mounted to a swivel plate or a fixed plate depending on the desired design of the gantry system 140. Using the wheels 162, the gantry system 140 can be manually moved by one or more human operators. Alternatively, the wheels 162 of the gantry system 140 can be turned using one or more electric motors under the control of the one or more human operators. The wheels 162 can be pneumatic or a caster wheel, as are known in the art.

Figure 2:
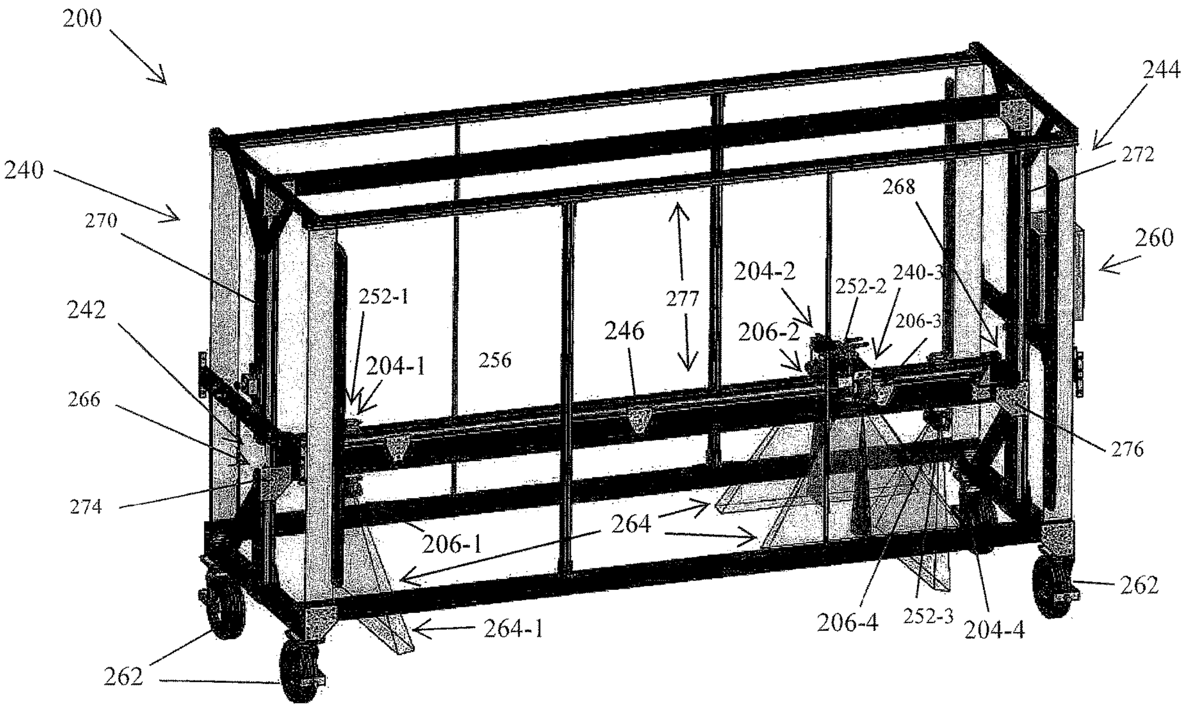
FIG. 2 illustrates an embodiment of the automated spray system according to one embodiment of the present disclosure.

Referring now to FIG. 2, there is shown an additional embodiment of the automated spray system 200 of the present disclosure for producing an elastomeric pad on the first major surface of the railroad tie. The automated spray system 200 seen in FIG. 2 is, however, not shown with all of the components of the two-component spray system as described above for FIG. 1, showing only the spray applicator 204 and the nozzle 206. The remaining components of the two-component spray system for spraying the two-component reaction mixture to produce the elastomeric pad on the railroad tie would be present but are not shown to allow the present embodiment of the gantry system 240 to be more clearly seen.

The embodiments of the automated spray system 200 seen in FIG. 2 shows the use of two or more of the spray applicator 204 with the nozzle 206. As seen in FIG. 2, four spray applicators (204-1, 204-2, 204-3 and 204-4) each with a nozzle (206-1, 206-2, 206-3, 206-4) are shown mounted on the girder 246 of the gantry system 240. As seen, the nozzles 206-1, 206-2, 206-3 and 206-4 are each configured to provide a defined spray pattern 264 for the first liquid component and the second liquid component of the two-component reaction mixture, where the defined spray pattern 264 of one nozzle (e.g., 264-1) can be either parallel and/or perpendicular to another spray pattern of another nozzle.

The automated spray system 200 includes the gantry system 240, as previously described, having the first support frame 242, the second support frame 244 and the girder 246 that extends between and is supported by the first support frame 242 and the second support frame 244. As illustrated in FIG. 2, the girder 246 supports four of the spray applicator 204-1, 204-2, 204-3 and 204-4. The automated spray system 200 further includes two or more of the trolley 252 on which the spray applicators (204-1, 204-2, 204-3 and 204-4) each with a nozzle (206-1, 206-2, 206-3, 206-4) are mounted. Each of the trolleys 252-1, 252-2 and 252-3 includes a motor, as previously described, to provide relative motion between the nozzle (e.g., 206-1, 206-2, 206-3 and/or 206-4) of the respective spray applicator (204-1, 204-2, 204-3 and/or 204-4) and the first major surface of the railroad tie. In the embodiment illustrated in FIG. 2, it is possible to produce an elastomeric pad on the first major surface of two or more of the railroad tie simultaneously or sequentially as desired.

The embodiment of the automated spray system 200 further includes the control unit 260 as described herein to separately control the first pump and the second pump of the two-component spray system and each of the motors of each of the trolleys 252-1, 252-2 and 252-3. As seen in FIG. 2, each of the trolleys 252-1, 252-2 and 252-3 is mounted to the girder 246, where a first and a second of the spray applicators (204-1 and 204-2) are mounted on one of the trolleys 252-1, the third spray applicator (204-3) is mounted on a second of the trolleys 252-2 and the fourth spray applicator (204-4) is mounted on a third of the trolleys 252-2. As appreciated, different combinations and/or numbers of each of the spray applicators and/or trolleys can be used on the girder of the automated spray system and FIG. 2 provides only one example of such a combination. Each of the trolleys 252-1, 252-2 and 252-3 can be as described above where different types of such trolleys (e.g., trolley with wheels riding atop the girder and a high speed belt drive actuator used as another trolley) can be used in the automated spray system 200.

In the present embodiment, the trolleys 252 travels in both directions along the longitudinal axis 256 of the girder 246 under the control of the control unit 260 to provide the relative motion between the nozzles (206-1, 206-2, 206-3, 206-4) of the spray applicators (204-1, 204-2, 204-3 and 204-4) and the first major surface of the railroad tie along a first-axis of travel 258. The first support frame 242 and the second support frame 244 of the gantry system 240 are also shown with wheels 262 to support the gantry system 240, where the wheels 262 are as previously described herein.

FIG. 2 further illustrates an embodiment of the automated spray system 200 where the girder 246 of the gantry system 240 can move vertically relative to the first major surface of the railroad tie. For example, as seen in FIG. 2 the girder 246 includes a first end 266 and a second end 268 spaced longitudinally from the first end 266. The first support frame 242 also further includes a first vertical guide rail 270 and the second support frame 244 includes a second vertical guide rail 272 opposite the first vertical guide rail 270. A first guide assembly 274 is present at the first end 266 of the girder 246 and a second guide assembly 276 at the second end 268 of the girder 246.

For the various embodiments, the first guide assembly 274 engages the first vertical guide rail 270 and the second guide assembly 276 engages the second vertical guide rail 272 to allow the girder 246 to move vertically 277 (perpendicularly) relative the plane of the first major surface of the railroad tie. For example, the first guide assembly 274 and the second guide assembly 276 can each include a V-groove caster and the first vertical guide rail 270 and the second vertical guide rail 272 can each be V-groove track that receives and guides the V-groove caster of the respective first guide assembly 274 and second guide assembly 276. Other wheel/caster types for the first guide assembly 274 and the second guide assembly 276 and track configurations for the first vertical guide rail 270 and second vertical guide rail 272 are possible.

Moving the girder 246 vertically 277 (perpendicularly) relative the plane of the first major surface of the railroad tie can be accomplished in a number of ways. For example, moving the girder 246 vertically (perpendicularly) relative the plane of the first major surface of the railroad tie can be done manually to either raise or lower the girder 246 relative the plane of the first major surface of the railroad tie. Alternatively, moving the girder 246 vertically (perpendicularly) relative the plane of the first major surface of the railroad tie can be done using a first belt drive actuator and a second belt drive actuator mounted along each of the respective first vertical guide rail 270 and second vertical guide rail 272, where the first end 266 and the second end 268 of the girder 246 are attached to the respective mounting table of the belt drive actuator mounted along each of the first vertical guide rail 270 and second vertical guide rail 272. For the various embodiments, the control unit 260 is coupled to the motor of each of the first belt drive actuator and the second belt drive actuator, where the control unit 260 includes machine-readable instructions executable to control the motor of each of the first belt drive actuator and the second belt drive actuator to move the girder 246 vertically (perpendicularly) to either raise or lower the girder 246 relative the plane of the first major surface of the railroad tie.

Figure 3:
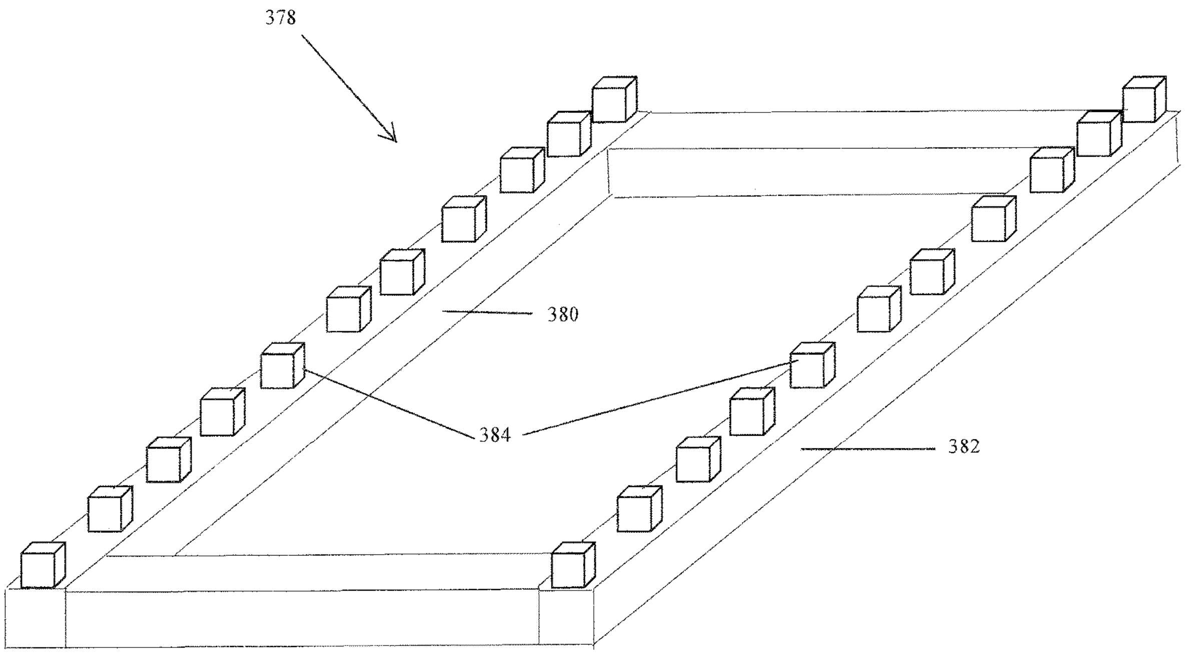
FIG. 3 illustrates an embodiment of railroad tie support frame according to one embodiment of the present disclosure.

Referring now to FIG. 3, there is shown an embodiment of a railroad tie support frame 378 according to the present disclosure. The railroad tie support frame 378 includes a first elongate guide rail 380, a second elongate guide rail 382 parallel with and spaced laterally from the first elongate guide rail 380 and vertical guide pins 384 longitudinally space along each of the first elongate guide rail 380 and the second elongate guide rail 382. When in use, the first elongate guide rail 380 and the second elongate guide rail 382 support the railroad tie and the vertical guide pins 384 align the first major surface of the railroad tie relative to the girder of the gantry system, as discussed herein. In one embodiment, the vertical guide pins 384 can align the first major surface of the railroad tie to be parallel with the girder of the gantry system. In an alternative embodiment, the vertical guide pins 384 can align the first major surface of the railroad tie to be perpendicular with the girder of the gantry system. Components of the railroad tie support frame 378 can be formed from structural steel components having cross sectional shapes as are known in the art. Examples of such shapes include, but are not limited to, beams (e.g., I-beam, H-beam), channel shapes (e.g., "C"-beam), angle shapes (e.g., L-shape), plate shapes and hollow structural section (HSS) shapes (e.g., round tubular, square or rectangular tubular shapes), among other known in the art. The structural steel components of the railroad tie support frame 378 can be joined by any number of known techniques, including the use of nuts and bolts passing though openings in the structural steel components and the use of welding techniques such as electric arc welding (shielded metal arc welding), gas tungsten arc welding, gas metal arc welding and/or flux-core arc welding, among others. Suitable steels used in the structural steel components include carbon steels, high strength low allow steels and corrosion resistant high strength low allow steels as are known in the art, including those identified and specified by ASTM International.

Figure 4:
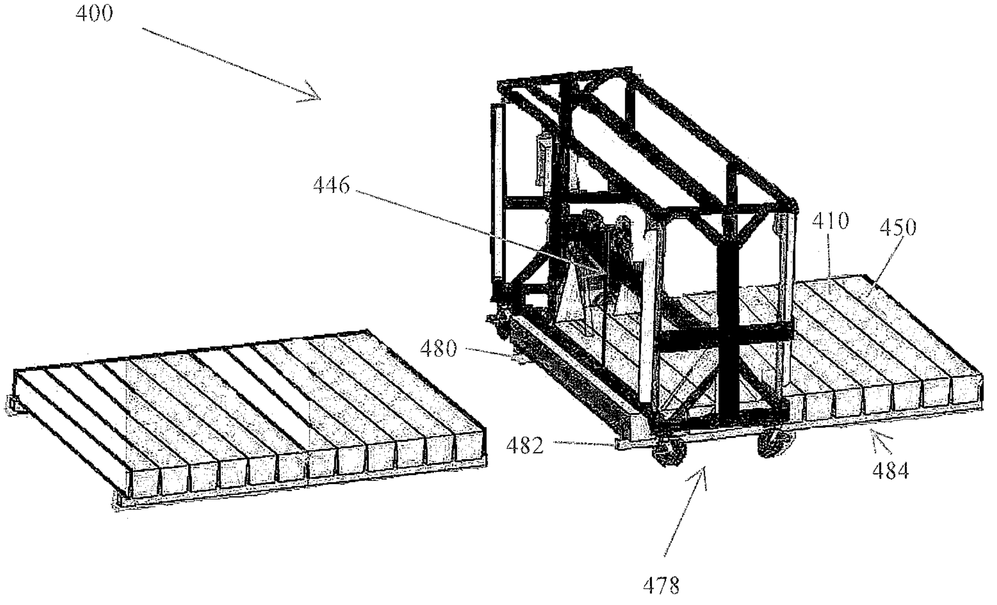
FIG. 4 illustrates an embodiment of the automated spray system according to one embodiment of the present disclosure.

Referring now to FIG. 4, there is shown an embodiment of the automated spray system 400 seen and described in FIG. 2 with the railroad tie support frame 478 seen and described in FIG. 3. As illustrated, the railroad tie support frame 478 includes the first elongate guide rail 480, the second elongate guide rail 482 parallel with and spaced laterally from the first elongate guide rail 480 and vertical guide pins 484 longitudinally space along each of the first elongate guide rail 480 and the second elongate guide rail 482, where the first elongate guide rail 480 and the second elongate guide rail 482 support the railroad tie 410 and the vertical guide pins 484 align the first major surface 450 of the railroad tie 410 relative to the girder 546 of the gantry system 440, as discussed herein. As illustrated, the vertical guide pins 484 align the first major surface 450 of the railroad tie 410 to be parallel with the girder 446 of the gantry system 440.

Figure 5:
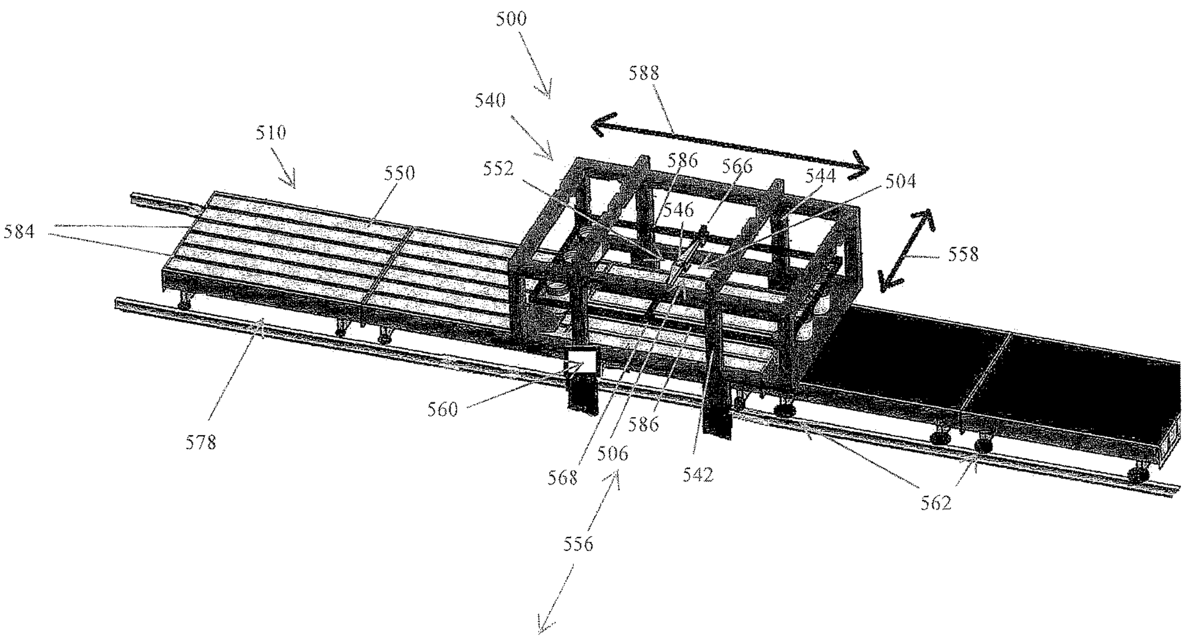
FIG. 5 illustrates an embodiment of the automated spray system according to one embodiment of the present disclosure.

Referring now to FIG. 5, there is shown an additional embodiment of the automated spray system 500 of the present disclosure for producing an elastomeric pad on the first major surface 550 of a railroad tie 510. The automated spray system 500 seen in FIG. 5 is, however, not shown with all of the components of the two-component spray system as described above for FIG. 1, showing only the spray applicator 504 and the nozzle 506. The remaining components of the two-component spray system for spraying the two-component reaction mixture to produce the elastomeric pad on the railroad tie would be present but are not shown to allow the present embodiment of the gantry system 540 to be more clearly seen.

The embodiments of the automated spray system 500 seen in FIG. 5 shows the use of the spray applicator 504 with the nozzle 506, where the spray applicator 504 is shown mounted on the girder 546 of the gantry system 540. The gantry system 540 is as previously described, having the first support frame 542, the second support frame 544 and the girder 546 that extends between and is supported by the first support frame 542 and the second support frame 544. As illustrated in FIG. 5, the girder 546 supports the trolley 552 on which the spray applicator 504 is mounted. The trolley 552 includes a motor, as previously described, to provide relative motion between the nozzle 506 of the spray applicator 504 and the first major surface 550 of the railroad tie 510 under the control of the control unit 560. In the embodiment illustrated in FIG. 5, it is possible to produce an elastomeric pad on the first major surface 550 of two or more of the railroad tie 510 simultaneously or sequentially as desired.

The embodiment of the automated spray system 500 further includes the control unit 560 as described herein to separately control the first pump and the second pump of the two-component spray system and the motor of the trolley 552. As seen in FIG. 5, the trolley 552 is mounted to the girder 546 where the trolley 552 can travel in both directions along the longitudinal axis 556 of the girder 546 under the control of the control unit 560 to provide the relative motion between the nozzle 506 of the spray applicator 504 and the first major surface 550 of the railroad tie 510 along the first-axis of travel 558. FIG. 5 further illustrates an embodiment of the automated spray system 500 where the girder 546 of the gantry system 540 can move in a second-axis 588 of travel. As previously discussed, the spray applicator 504 is attached to the trolley 552 and the trolley 552 is mounted on the girder 546, where the trolley 546 travels along the longitudinal axis 556 of the girder 546 under the control of the control unit 560 to provide the relative motion between the nozzle 506 of the spray applicator 504 and the first major surface 550 of the railroad tie 510 along the first-axis of travel 558. In FIG. 5, the gantry system 540 further includes a lateral support frame 586 along which the girder 546 travels under the control of the control unit 560 perpendicular to the longitudinal axis 556 of the girder 546 to provide the girder 546 with a second-axis of travel 588.

Moving the girder 546 along the second-axis of travel 588 can be accomplished in a number of ways. For example, moving the girder 546 along the second-axis of travel 588 can be done using a first belt drive actuator and a second belt drive actuator mounted along each of the respective longitudinal sides of the lateral support frame 586, where the first end 566 and the second end 568 of the girder 546 are attached to the respective mounting table of the belt drive actuator mounted on each of the respective longitudinal sides of the lateral support frame 586. For the various embodiments, the control unit 560 is coupled to the motor of each of the first belt drive actuator and the second belt drive actuator, where the control unit 560 includes machine-readable instructions executable to control the motor of each of the first belt drive actuator and the second belt drive actuator to move the girder 546 back and forth along the second-axis of travel 588.

FIG. 5 also shows an embodiment of the railroad tie support frame 578 where the vertical guide pins 584 of the railroad tie support frame 578 align the first major surface 550 of the railroad tie 510 to be perpendicular with the girder 546 of the gantry system 540. FIG. 5 further illustrates an embodiment in which the railroad tie support frame 578 of the automated spray system 500 is mounted on wheels 562 to allow the railroad ties supported by the railroad tie support frame 578 to be moved relative the nozzle 506 of the spray applicator 504 and the gantry system 540.

Figure 6:
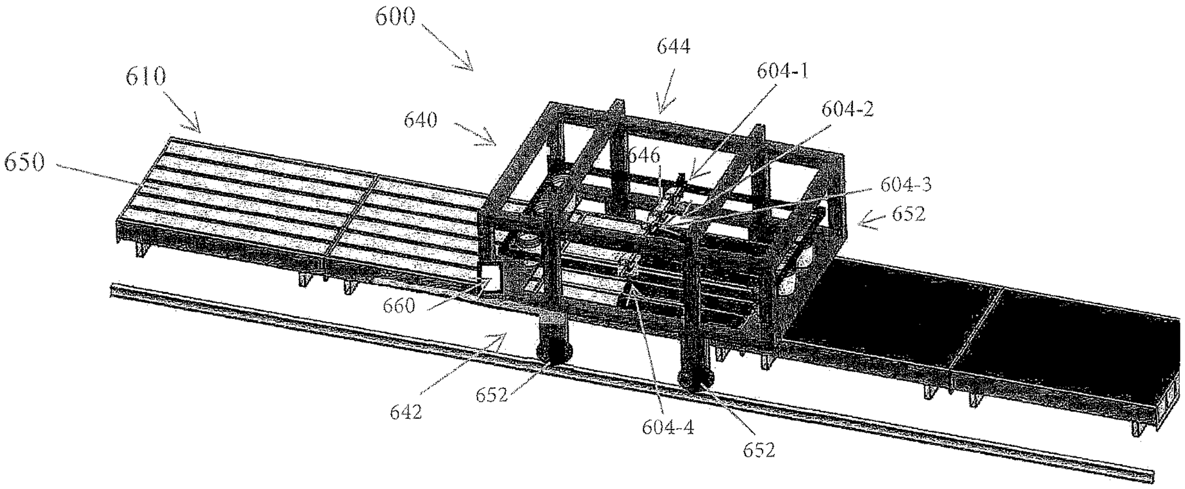
FIG. 6 illustrates an embodiment of the automated spray system according to one embodiment of the present disclosure.

Referring now to FIG. 6 there is shown an additional embodiment of the automated spray system 600 of the present disclosure for producing an elastomeric pad on the first major surface 650 of a railroad tie 610. The automated spray system 600 seen in FIG. 6 is, however, not shown with all of the components of the two-component spray system as described above for FIG. 1, showing only the spray applicator 604 and the nozzle, as previously described and illustrated. The remaining components of the two-component spray system for spraying the two-component reaction mixture to produce the elastomeric pad on the railroad tie would be present but are not shown to allow the present embodiment of the gantry system 640 to be more clearly seen.

The embodiments of the automated spray system 600 seen in FIG. 6 shows the use of two or more of the spray applicator 604 with the nozzle, where the spray applicator 604 is shown mounted on the girder 646 of the gantry system 640. The gantry system 640 is as previously described, having the first support frame 642, the second support frame 644 and the girder 646 that extends between and is supported by the first support frame 642 and the second support frame 644. As illustrated in FIG. 6, the girder 646 supports two or more of the spray applicators 604-1, 604-2, 604-3 and 604-4, where the two or more of the spray applicators 604-1, 604-2, 604-3 and 604-4 are statically mounted to the girder 646.

FIG. 6 further shows the gantry system 640 mounted on the trolley 652 to allow the motor of the trolley system to move the nozzle of the spray applicator 604-1, 604-2, 604-3 and 604-4 relative the first major surface 650 of the railroad tie 610. As previously discussed, the trolley 652 includes a motor, as previously described, to provide relative motion between the nozzle of the spray applicator 604-1, 604-2, 604-3 and 604-4 and the first major surface 650 of the railroad tie 610 under the control of the control unit 660. In the embodiment illustrated in FIG. 6, it is possible to produce an elastomeric pad on the first major surfaces 650 of two or more of the railroad tie 610 simultaneously or sequentially as desired.

The embodiment of the automated spray system 600 further includes the control unit 660 as described herein to separately control the first pump and the second pump of the two-component spray system and the motor of the trolley 652. As seen in FIG. 6, the trolley 652 is mounted to the first support frame 642 and the second support frame 644 of the gantry system 640 where the trolley 652 can travel in both directions along a longitudinal axis 660 of the railroad ties 610 under the control of the control unit 660 to provide the relative motion between the nozzle of the spray applicator 604-1, 604-2, 604-3 and 604-4 and the first major surface 650 of the railroad tie 610.

Figure 7:
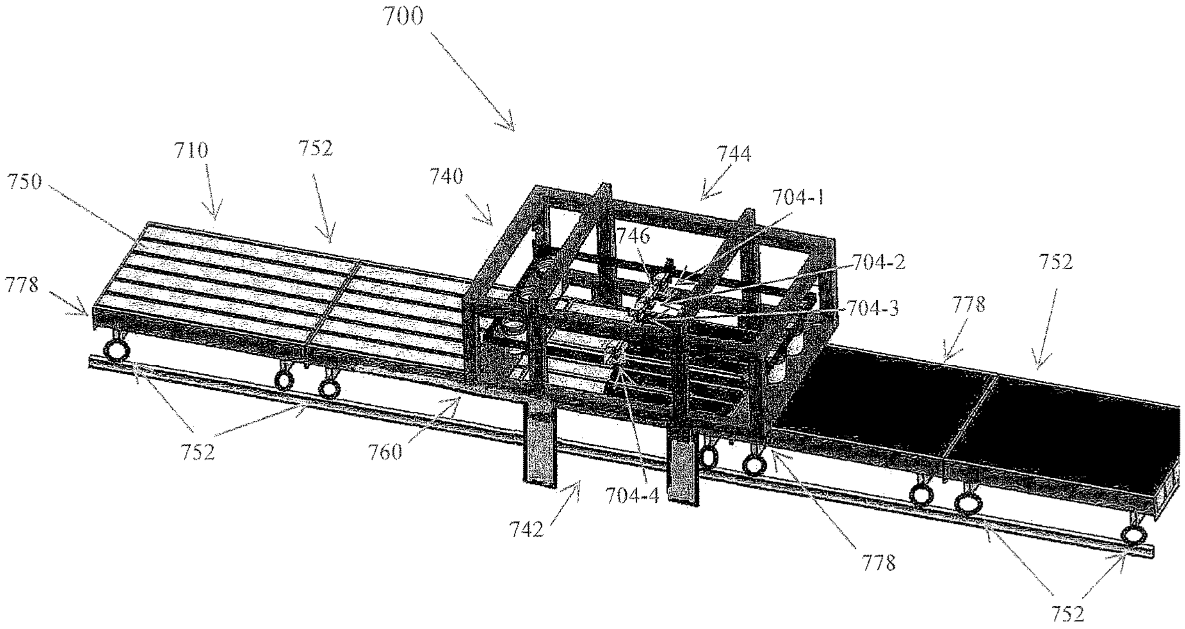
FIG. 7 illustrates an embodiment of the automated spray system according to one embodiment of the present disclosure.

Referring now to FIG. 7 there is shown an additional embodiment of the automated spray system 700 of the present disclosure for producing an elastomeric pad on the first major surface 750 of a railroad tie 710. The automated spray system 700 seen in FIG. 7 is, however, not shown with all of the components of the two-component spray system as described above for FIG. 1, showing only the spray applicator 704 and the nozzle, as previously described and illustrated. The remaining components of the two-component spray system for spraying the two-component reaction mixture to produce the elastomeric pad on the railroad tie would be present but are not shown to allow the present embodiment of the gantry system 740 to be more clearly seen.

The embodiments of the automated spray system 700 seen in FIG. 7 shows the use of two or more of the spray applicator 704 with the nozzle, where the spray applicator 704 is shown mounted on the girder 746 of the gantry system 740. The gantry system 740 is as previously described, having the first support frame 742, the second support frame 744 and the girder 746 that extends between and is supported by the first support frame 742 and the second support frame 744. As illustrated in FIG. 7, the girder 746 supports two or more of the spray applicators 704-1, 704-2, 704-3 and 704-4, where the two or more of the spray applicators 704-1, 704-2, 704-3 and 704-4 are statically mounted to the girder 746.

FIG. 7 further shows the railroad tie support frame 778 mounted on the trolley 752 to provide relative motion between the nozzle of the spray applicator 704-1, 704-2, 704-3 and 704-4 and the first major surface 750 of the railroad tie 710. As previously discussed, the trolley 752 includes a motor, as previously described, to provide relative motion between the nozzle of the spray applicator 704-1, 704-2, 704-3 and 704-4 and the first major surface 750 of the railroad tie 710 under the control of the control unit 760. In the embodiment illustrated in FIG. 7, it is possible to produce an elastomeric pad on the first major surfaces 750 of two or more of the railroad tie 710 simultaneously or sequentially as desired.

The embodiment of the automated spray system 700 further includes the control unit 760 as described herein to separately control the first pump and the second pump of the two-component spray system and the motor of the trolley 752. As seen in FIG. 7, the trolley 752 is mounted to the railroad tie support frame 778 where the trolley 752 can travel in both directions along a longitudinal axis 760 of the railroad ties 710 under the control of the control unit 760 to provide the relative motion between the nozzle of the spray applicator 704-1, 704-2, 704-3 and 704-4 and the first major surface 750 of the railroad tie 710.

Figure 8:
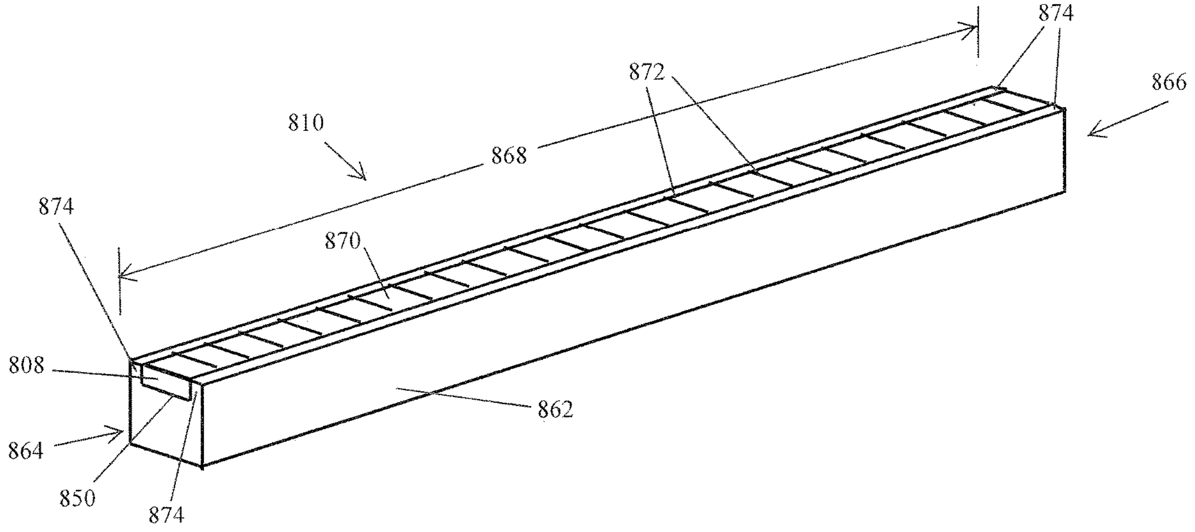
FIG. 8 illustrates an embodiment of a railroad tie with an elastomeric pad on a first major surface of the railroad tie according to one embodiment of the present disclosure.

FIG. 8 provides an embodiment of the railroad tie 810 having the elastomeric pad 808 according to the present disclosure. The railroad tie 810 includes an elongate rail tie 862 having a first major surface 850 extending longitudinally from a first end 864 to a second end 866 defining a longitudinal length 868 of the elongate rail tie 862 there between and the elastomeric pad 808 of the two-component foam on the first major surface 850 of the elongate rail tie 862. For the various embodiments, the elastomeric pad 808 of the two-component foam has an exterior layer 870 distal to the first major surface 850 and defines a surface with a series of projections 872, each projection 872 having an amplitude of 0.01 centimeter to 2 centimeter. The projections 872 of the exterior layer 870 help to entrap ballast under the railroad tie 810 to enhance railroad tie 810 lateral movement resistance.

For the various embodiments, the series of projections 872 define a waveform with waves of the amplitude of 0.01 centimeter to 2 centimeter and a wavelength of 0.01 centimeter and 20 centimeter. For the various embodiments, the waveform of the first major surface 850 can be a repeating wave pattern. For example, the repeating wave pattern can be selected from the group consisting of a sinusoidal wave pattern and a trochoid wave pattern. Such repeating wave patterns can be either straight lines and/or curved lines. For the various embodiments, the repeating wave pattern has a wave peak to a wavelength ratio value of 0.1 to 1.0. For the various embodiments, the amplitude of each projection 872 can have the same value. In an alternative embodiment, the amplitude of each projection 872 varies along the surface of the exterior layer 870 of the two-component foam.

For the various embodiments, the two-component foam is selected from the group consisting of polyurethane foam, polyurea and combinations thereof, as previously discussed. For the various embodiments, the elongate rail tie includes ridges 874 extending from the first major surface 850 and extending longitudinally from the first end 864 to the second end 866 of the elongate rail tie 862, where the elastomeric pad of the two-component foam is positioned between the ridges 874. For the various embodiments, the elongate rail tie is formed from a material selected from wood, concrete, iron alloy and combinations thereof.

The present disclosure further includes a method of forming the elastomeric pad of the two-component foam on a railroad tie 810. The method includes supplying an elongate rail tie 862 having a first major surface 850 that extends longitudinally from a first end to a second end 866 defining a longitudinal length 868 of the elongate rail tie 862; and spraying components of the two-component foam reaction mixture from the spray system, as discussed herein, on the first major surface 850 of the elongate rail tie 862, where the spray system deposits the two-component foam reaction mixture to produce an elastomeric pad having the exterior layer 870 distal to the first major surface 850 defining the surface with a series of projections 872, each projection 872 having an amplitude of 0.01 centimeter to 2 centimeter and where the projections 872 of the exterior layer 870 entrap ballast under the railroad tie 810 to enhance railroad tie 810 lateral movement resistance.

For the various embodiments, spraying the two-component foam reaction mixture from the spray system provides the surface with the periodic waveform, as discussed herein, with waves of the amplitude of 0.01 centimeter to 2 centimeter and a wavelength of 0.01 centimeter and 20 centimeter. For the various embodiments, spraying the two-component foam reaction mixture from the spray system includes adjusting a spray speed of the spray system moving at a constant rate over the first major surface 850 of the elongate rail tie 862 to form the waveform of the exterior layer 870 of the elastomeric pad. In an alternative embodiment, spraying the two-component foam reaction mixture from the spray system includes adjusting a spray pressure of the spray system moving at a constant rate over the first major surface 850 of the elongate rail tie 862 to form the waveform of the exterior layer 870 of the elastomeric pad.

Spray conditions for achieving the projections 872 on the exterior layer 870 include a spray pressure of 10 to 150 psi or 1000 to 3000 psi. For the various embodiments, the gel time in conjunction with the spay pressure allows for achieving the projections 872 on the exterior layer 870, where the gel times for the two-component reaction mixture are 4 to 15 seconds, preferably 4 to 8 seconds. The flow rate is also used in achieving the projections 872 on the exterior layer 870. Spraying speed from 1 inch/second to 20 inch/second to control material thickness variation over the length of railroad tie. Spray applicator mixing chamber hole size from 0.02 inches to 0.08 inches. Preferably, the achieving the projections 872 on the exterior layer 870 can be achieved by using a spray speed of 1 inch/second to 5 inch/second and a mixing chamber hole size of 0.03 inches to 0.05 inches. Spray head can be either air purged or mechanical purged. Preferably mechanical purge for lower material buildup inside the spray applicator.

For the various embodiments, the method further includes moving the first surface of the elongate rail tie 862 at a predetermined speed relative the spray system as the spray system deposits the two-component foam reaction mixture. For the various embodiments, the predetermined speed is not a constant speed. For the various embodiments, the method of forming the elastomeric pad of the two-component foam on the railroad tie 810 can further include utilizing two or more spray heads, as discussed herein, to deposit the polyurethane reaction mixture on the first major surface. Utilizing two or more spray heads further can further include individually controlling each of the two or more spray heads to deposit the polyurethane reaction mixture.

What is claimed is:

1. An automated spray system to produce an elastomeric pad on a first major surface of a railroad tie, the automated spray system comprising:

a two-component spray system having a first storage tank to hold a first liquid component of a two-component reaction mixture, a second storage tank to hold a second liquid component of the two-component reaction mixture, a first hose, a second hose, a first pump having an inlet and an outlet, a second pump having an inlet and an outlet, and a spray applicator with a mixing chamber to mix the first liquid component and the second liquid component of the two-component reaction mixture, the mixing chamber having a first mixing chamber inlet, a second mixing chamber inlet, a mixing chamber outlet and a nozzle at the mixing chamber outlet, wherein:
 the first hose fluidly connects the first liquid component in the first storage tank to the inlet of the first pump;
 the second hose fluidly connects the second liquid component in the second storage tank to the inlet of the second pump; and
 the outlet of the first pump fluidly connected to the first mixing chamber inlet and the outlet of the second pump fluidly connect to the second mixing chamber inlet of the mixing chamber of the spray applicator;

a gantry system having a first support frame, a second support frame and a girder that extends between and is supported by the first support frame and the second support frame, wherein the girder supports the spray applicator and wherein the gantry system straddles the railroad tie to position the nozzle of the spray applicator in a position over the first major surface of the railroad tie;

a trolley having a motor to provide relative motion between the nozzle of the spray applicator and the first major surface of the railroad tie; and a control unit coupled to the first pump and the second pump including machine-readable instructions executable to regulate the volumetric flow rate of the first liquid component through the first mixing chamber inlet, the volumetric flow rate of the second liquid component through the second mixing chamber inlet and thereby the volumetric flow rate of the two-component reaction mixture spraying from the nozzle of the spray applicator, and wherein the control unit is coupled to the motor of the trolley to control the motor of the trolley to provide the relative motion between the nozzle of the spray applicator and the first major surface of the railroad tie as the spray applicator sprays the two-component reaction mixture onto the first major surface of the railroad tie to produce the elastomeric pad, wherein:

the spray applicator is attached to the trolley and the trolley is mounted on the girder, the trolley travelling along a longitudinal axis of the girder under the control of the control unit to provide the relative motion between the nozzle of the spray applicator and the first major surface of the railroad tie along a first-axis of travel.

2. The automated spray system of claim 1, wherein the gantry system further includes a lateral support frame along which the girder travels under the control of the control unit perpendicular to the longitudinal axis of the girder to provide the girder with a second-axis of travel.

3. An automated spray system to produce an elastomeric pad on a first major surface of a railroad tie, the automated spray system comprising:

a two-component spray system having a first storage tank to hold a first liquid component of a two-component reaction mixture, a second storage tank to hold a second liquid component of the two-component reaction mixture, a first hose, a second hose, a first pump having an inlet and an outlet, a second pump having an inlet and an outlet, and a spray applicator with a mixing chamber to mix the first liquid component and the second liquid component of the two-component reaction mixture, the mixing chamber having a first mixing chamber inlet, a second mixing chamber inlet, a mixing chamber outlet and a nozzle at the mixing chamber outlet, wherein:

the first hose fluidly connects the first liquid component in the first storage tank to the inlet of the first pump;

the second hose fluidly connects the second liquid component in the second storage tank to the inlet of the second pump; and the outlet of the first pump fluidly connected to the first mixing chamber inlet and the outlet of the second pump fluidly connect to the second mixing chamber inlet of the mixing chamber of the spray applicator;

a gantry system having a first support frame, a second support frame and a girder that extends between and is supported by the first support frame and the second support frame, wherein the girder supports the spray applicator and wherein the gantry system straddles the railroad tie to position the nozzle of the spray applicator in a position over the first major surface of the railroad tie;

a trolley having a motor to provide relative motion between the nozzle of the spray applicator and the first major surface of the railroad tie; and a control unit coupled to the first pump and the second pump including machine-readable instructions executable to regulate the volumetric flow rate of the first liquid component through the first mixing chamber inlet, the volumetric flow rate of the second liquid component through the second mixing chamber inlet and thereby the volumetric flow rate of the two-component reaction mixture spraying from the nozzle of the spray applicator, and wherein the control unit is coupled to the motor of the trolley to control the motor of the trolley to provide the relative motion between the nozzle of the spray applicator and the first major surface of the railroad tie as the spray applicator sprays the two-component reaction mixture onto the first major surface of the railroad tie to produce the elastomeric pad, wherein at least a portion of the gantry system is mounted on the trolley to allow the motor of the trolley system to move the nozzle of the spray applicator relative the first major surface of the railroad tie.

4. An automated spray system to produce an elastomeric pad on a first major surface of a railroad tie, the automated spray system comprising:

a two-component spray system having a first storage tank to hold a first liquid component of a two-component reaction mixture, a second storage tank to hold a second liquid component of the two-component reaction mixture, a first hose, a second hose, a first pump having an inlet and an outlet, a second pump having an inlet and an outlet, and a spray applicator with a mixing chamber to mix the first liquid component and the second liquid component of the two-component reaction mixture, the mixing chamber having a first mixing chamber inlet, a second mixing chamber inlet, a mixing chamber outlet and a nozzle at the mixing chamber outlet, wherein:

the first hose fluidly connects the first liquid component in the first storage tank to the inlet of the first pump;

the second hose fluidly connects the second liquid component in the second storage tank to the inlet of the second pump; and the outlet of the first pump fluidly connected to the first mixing chamber inlet and the outlet of the second pump fluidly connect to the second mixing chamber inlet of the mixing chamber of the spray applicator;

a gantry system having a first support frame, a second support frame and a girder that extends between and is supported by the first support frame and the second support frame, wherein the girder supports the spray applicator and wherein the gantry system straddles the railroad tie to position the nozzle of the spray applicator in a position over the first major surface of the railroad tie;

a trolley having a motor to provide relative motion between the nozzle of the spray applicator and the first major surface of the railroad tie;

a control unit coupled to the first pump and the second pump including machine-readable instructions executable to regulate the volumetric flow rate of the first liquid component through the first mixing chamber inlet, the volumetric flow rate of the second liquid component through the second mixing chamber inlet and thereby the volumetric flow rate of the two-component reaction mixture spraying from the nozzle of the spray applicator, and wherein the control unit is coupled to the motor of the trolley to control the motor of the trolley to provide the relative motion between the nozzle of the spray applicator and the first major surface of the railroad tie as the spray applicator sprays the two-component reaction mixture onto the first major surface of the railroad tie to produce the elastomeric pad; and a railroad tie support frame having a first elongate guide rail, a second elongate guide rail parallel with and spaced laterally from the first elongate guide rail and vertical guide pins longitudinally space along each of the first elongate guide rail and the second elongate guide rail, wherein the first elongate guide rail and the second elongate guide rail support the railroad tie and the vertical guide pins align the first major surface of the railroad tie relative to the girder of the gantry system.

5. The automated spray system of claim 4, wherein the vertical guide pins align the first major surface of the railroad tie to be parallel with the girder of the gantry system.

6. The automated spray system of claim 4, wherein the vertical guide pins align the first major surface of the railroad tie to be perpendicular with the girder of the gantry system.

7. The automated spray system of claim 4, wherein the railroad tie support frame is mounted on the trolley to allow the motor of the trolley system to move the first major surface of the railroad tie supported by the railroad tie support frame relative the nozzle of the spray applicator.

8. The automated spray system of claim 1, wherein the first support frame and the second support frame of the gantry system further include wheels to support the gantry system, wherein the wheels allow for the gantry system to move relative the railroad tie.

9. An automated spray system to produce an elastomeric pad on a first major surface of a railroad tie, the automated spray system comprising:

a two-component spray system having a first storage tank to hold a first liquid component of a two-component reaction mixture, a second storage tank to hold a second liquid component of the two-component reaction mixture, a first hose, a second hose, a first pump having an inlet and an outlet, a second pump having an inlet and an outlet, and a spray applicator with a mixing chamber to mix the first liquid component and the second liquid component of the two-component reaction mixture, the mixing chamber having a first mixing chamber inlet, a second mixing chamber inlet, a mixing chamber outlet and a nozzle at the mixing chamber outlet, wherein:

the first hose fluidly connects the first liquid component in the first storage tank to the inlet of the first pump;

the second hose fluidly connects the second liquid component in the second storage tank to the inlet of the second pump; and the outlet of the first pump fluidly connected to the first mixing chamber inlet and the outlet of the second pump fluidly connect to the second mixing chamber inlet of the mixing chamber of the spray applicator;

a gantry system having a first support frame, a second support frame and a girder that extends between and is supported by the first support frame and the second support frame, wherein the girder supports the spray applicator and wherein the gantry system straddles the railroad tie to position the nozzle of the spray applicator in a position over the first major surface of the railroad tie;

a trolley having a motor to provide relative motion between the nozzle of the spray applicator and the first major surface of the railroad tie; and a control unit coupled to the first pump and the second pump including machine-readable instructions executable to regulate the volumetric flow rate of the first liquid component through the first mixing chamber inlet, the volumetric flow rate of the second liquid component through the second mixing chamber inlet and thereby the volumetric flow rate of the two-component reaction mixture spraying from the nozzle of the spray applicator, and wherein the control unit is coupled to the motor of the trolley to control the motor of the trolley to provide the relative motion between the nozzle of the spray applicator and the first major surface of the railroad tie as the spray applicator sprays the two-component reaction mixture onto the first major surface of the railroad tie to produce the elastomeric pad, wherein;

the girder includes a first end and a second end spaced longitudinally from the first end;

the first support frame includes a first vertical guide rail and the second support frame includes a second vertical guide rail opposite the first vertical guide rail; and a first guide assembly at the first end of the girder and a second guide assembly at the second end of the girder, wherein the first guide assembly engages the first vertical guide rail and the second guide assembly engages the second vertical guide rail to allow the girder to move perpendicularly relative the first major surface of the railroad tie.

* * * * *